United States Patent
Liu

(10) Patent No.: US 7,765,733 B1
(45) Date of Patent: Aug. 3, 2010

(54) ULTRA-LOW OXYGEN TREATMENT FOR POST HARVEST PEST CONTROL ON AGRICULTURE PRODUCTS

(75) Inventor: Yong-Biao Liu, Salinas, CA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 11/591,724

(22) Filed: Nov. 1, 2006

Related U.S. Application Data

(60) Provisional application No. 60/732,678, filed on Nov. 1, 2005.

(51) Int. Cl.
*A01M 5/00* (2006.01)
(52) U.S. Cl. ........................ 43/132.1; 43/124
(58) Field of Classification Search ............... 43/124, 43/132.1
See application file for complete search history.

(56) References Cited

U.S. PATENT DOCUMENTS

| | | | | |
|---|---|---|---|---|
| 2,351,853 A | * | 6/1944 | Graham, Jr. ................. | 99/468 |
| 3,214,221 A | * | 10/1965 | Finnegan ..................... | 406/109 |
| 4,966,755 A | * | 10/1990 | Smith .......................... | 422/28 |
| 5,365,692 A | * | 11/1994 | Gustafson .................... | 43/124 |
| 5,792,419 A | * | 8/1998 | Williamson et al. ........... | 422/1 |
| 6,612,067 B2 | * | 9/2003 | Topp ............................ | 43/124 |
| 2002/0182104 A1 | * | 12/2002 | Carman et al. ................ | 422/28 |
| 2007/0193454 A1 | * | 8/2007 | Brown ......................... | 99/472 |

OTHER PUBLICATIONS

Liu, Yong-Biao "Ultralow Oxygen Treatment for Postharvest Control of *Nasonovia ribisnigri* (Homoptera:Aphididae) on Iceberg Lettuce," J. Econ. Entomol. (2005) 98(6):1899-1904.

* cited by examiner

*Primary Examiner*—Christopher P Ellis
(74) *Attorney, Agent, or Firm*—Elizabeth R. Sampson; Leslie Shaw; John Fado

(57) ABSTRACT

In one exemplary embodiment the invention provides methods for post harvest disinfection of agricultural commodities. The methods are practiced on agricultural commodities without damaging or otherwise injuring the commodities by way of the treatment. In other exemplary embodiments, the invention provides containers appropriate for carrying out the disclosed methods of disinfective treatment.

40 Claims, 2 Drawing Sheets

ULTRA-LOW OXYGEN TREATMENT FOR POST HARVEST PEST CONTROL ON AGRICULTURE PRODUCTS

CROSS REFERENCES TO RELATED APPLICATIONS

This application claims priority to U.S. 60/732,678 filed Nov. 1, 2005.

BACKGROUND OF THE INVENTION

Current post harvest disinfection treatments against insects on vegetables, grain, fruits, nursery stocks and other agricultural commodities rely heavily on chemical fumigation with chemicals such as e.g., methyl bromide and/or hydrogen cyanide. Indeed, eight percent of the entire methyl bromide market is for post harvest disinfection of commodities such as grain, fruits, and vegetables. Unfortunately, however, there are a number of problems associated with the use of chemicals such as methyl bromide for the post harvest disinfection of agricultural products.

An exemplary problem associated with the use of chemical fumigants for post harvest disinfection is the problem of toxicity. Toxicity is an issue for consumers who must contend with the residual fumigants left on treated produce, and for the workers who endure exposure as they conduct the fumigation. Methyl bromide is extremely toxic. Indeed, according to the U.S. Environmental Protection Agency, methyl bromide is a Class I Acute Toxin. Known effects of exposure include brain damage, harm to the nervous system, lungs, kidneys and liver and sometimes even death.

In addition to the toxic consequences associated with chemical fumigation of agricultural products, chemicals e.g., methyl bromide, also have negative impacts on the environment. For example, methyl bromide is a Class I Ozone Depleter, and its use is responsible for at least 5 to 10 percent of worldwide ozone depletion. Fortunately for the environment, but unfortunately for industries dependent on its use, production of methyl bromide will soon be phased out under the Clean Air Act and Montreal Protocol. Thus, alternatives to methyl bromide are needed more than ever before.

Chemical fumigation is not compatible with organic products, which are gaining popularity in both the United States and abroad. In addition, the use of chemical fumigants such as methyl bromide or hydrogen cyanide can be expensive, and can cause injury to the produce undergoing fumigation, thereby resulting in unsalable products.

Furthermore, the use of fumigation greatly hinders the export of U.S. lettuce and other commodities to some countries e.g., Japan which have stringent phytosanitary requirements. Indeed, contaminated shipments are regularly rejected at the port of entry. Thus, fumigation issues are of interest to the export industry since eliminating fumigation has the potential greatly increase export of US lettuce and other fresh commodities to overseas markets.

Clearly then, what is needed in the art are cost effective, safe, convenient, and reliable methods for the killing of agricultural pests that do not damage the quality of the agricultural product undergoing treatment, and which also do not introduce toxic pesticides or other chemical residues. Fortunately, the invention disclosed herein addresses these and other needs.

SUMMARY OF THE INVENTION

Cost effective, safe, convenient, and reliable methods for the killing of agricultural pests that do not introduce toxic pesticides or other chemical residues nor damage the quality of the agricultural product are clearly needed in the art. To address this need, in one aspect the invention provides a method for controlling pest populations on agricultural commodities without injury to the commodities. The method comprises placing the agricultural commodities in a controlled temperature environment and exposing the commodities to ultra-low oxygen conditions for a length of time sufficient to kill the pests without injury to the commodities.

In another aspect, the invention provides a container for controlling pest populations on agricultural commodities without injury to the commodities. In one embodiment, the container comprises a sealable enclosure; an oxygen sensor; a system for circulating air within the sealable enclosure; an automatic feedback control sensitive to oxygen concentration; a temperature control; and a nitrogen source or generator. In one embodiment the container further comprises a carbon dioxide adsorbent.

Other aspects, objects and advantages of the present invention will be apparent from the detailed description that follows.

DETAILED DESCRIPTION OF THE INVENTION

Definitions

Figure 1:
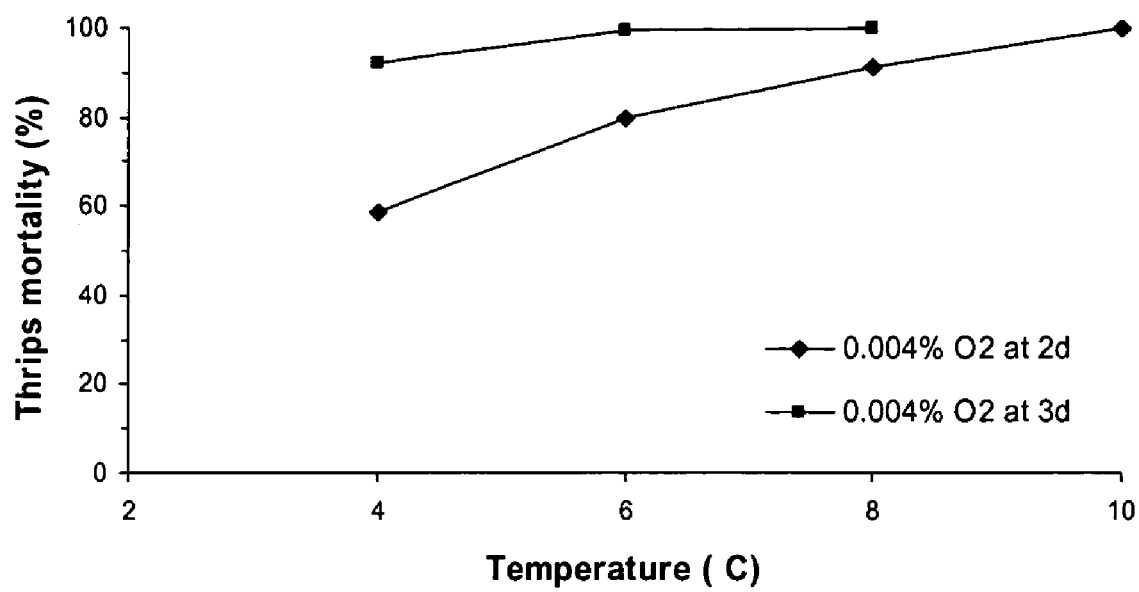
FIG. 1 An exemplary embodiment showing the affect of temperature on thrips mortality in 2 and 3 day Ultra-Low Oxygen (ULO) treatments.

The term "pest" as used herein, refers to any insect, arthropod, nematode or other organism that destroys or damages an agricultural commodity. Thus, "pest populations" refer to populations of insects, arthropods, nematodes or other organism that destroy or damage agricultural commodities.

As used herein, the term "control" or "controlling" as in e.g., the phrase: the "control" of pest populations, or "controlling" pest populations, or as in the phrase: "controlling" agricultural pests, refers to any means for preventing infection or infestation, reducing the population of already infected areas or organisms, or elimination of the population of pests e.g. thrips, aphids, mealy bugs, mites or other species whose "control" is desired. Indeed, "controlling" as used herein refers to any indica of success in prevention, elimination, reduction or amelioration' of a pest population or pest problem.

The term "agricultural commodity" as used herein, refers to any product of agricultural origin. As used herein an "agricultural commodity" is typically of plant or fungal origin. For example an agricultural commodity comprises fruits, vegetables fungi (e.g., mushrooms), trees, shrubs, wood, flowering plants, cut flowers, tubers, and the like.

The phrase "injury to the commodities" as used herein refers to damage to as measured by any method known in the art. See e.g., Lipton, W. J. (1980) HortScience 15:64-66; Abbott, J. A. (1999) Postharv. Biol. Technol. 15:207-225; Anon. Various dates. U.S. Standards for Grades of Fresh Fruits and Vegetables. U.S. Department of Agriculture, Food Safety and Quality Service, Washington, D.C.; Chen, P. and Z. Sun. (1991) J. Agr. Eng. Res. 49:85-98; Kader, A. A. ed. (2002) Univ. of Calif., Div. of Agric. & Nat. Resources. Special Publ. 3311, third edition, 535 p. (Chapters 22 & 23).

The phrase "controlled temperature environment" as used herein refers to an environment created by enclosure in which a desired temperature is maintained by any method known in the art.

The term "ultra-low oxygen" or "ULO" as used herein refers to conditions wherein the oxygen concentration in the atmosphere is generally less than or equal to about 1%. In some embodiments "ULO" is about 0.05%, about 0.025%, about 0.024%, about 0.023%, about 0.022%, about 0.021%, about 0.02%, about 0.019%, about 0.018%, about 0.017%, about 0.016%, about 0.015%, about 0.014%, about 0.013%, about 0.012%, about 0.011%, about 0.01%, about 0.009%, about 0.008%, about 0.007%, about 0.006%, about 0.005%, about 0.004%, about 0.003%, about 0.002%, about 0.001%, about 0.0009%, about 0.0008%, about 0.0007%, about 0.0006%, about 0.0005%, about 0.0004%, about 0.0003%. Therefore, the phrase "ultra-low oxygen conditions" refers to conditions wherein a state of ULO is achieved.

The phrase "a length of time sufficient to kill the pests" as used herein refers to the amount of time needed to kill at least about 65%, 70%, 75%, 80%, 85%, 86%, 87%, 88%, 89%, 90%, 91%, 92%, 93%, 94%, 95%, 96%, 97%, 98%, 99%, 100% of the actual or estimated pest population infesting a post harvest agricultural commodity under a given set of environmental conditions e.g., ULO conditions.

The term "post harvest" as used herein, refers to the point in time in which an agricultural commodity is harvested for sale, trade, or other human use. With respect to edible commodities e.g., fruit, vegetables, and fungi or non edible commodities that are picked, e.g., flowers, the commodity begins its existence as "post harvest" after picking. For non-edible commodities e.g., trees, shrubs, flowering plants and/or seedling stocks, post harvest is the point at which the commodity is packed, harvested or otherwise prepared for marketing.

The phrase "without damage to the agricultural commodity" or "without injury to the agricultural commodity" or equivalent expressions as used herein refer to quality measurements. In one embodiment "without injury to the agricultural commodity" or equivalent expressions one refers to no negative effects on quality or shelf life as measure by methods known in the art (see e.g., "injury to the commodities" definition above for exemplary citations of known methods). In another embodiment, "without injury to the agricultural commodity" or equivalent expressions refer to acceptable quality changes such as minor injury to treated products as measure by methods known in the art.

I. Introduction

The development of produce-friendly, non-toxic alternatives to current toxic chemical fumigation methods for the post harvest disinfection of agricultural products is needed for the continued profitability of U.S. agriculture at home and around the world. The cost of current chemical fumigation methods is often prohibitively expensive and can result in damage to the agricultural commodity being treated. Damage associated with chemical fumigation methods frequently results in rejection of exports at the port of entry.

Increasing or even maintaining current levels of export of U.S. agricultural products depends on dealing effectively with quarantine pest problems. As an example of the current pest problem facing agricultural exporters, lettuce insects including but not limited to aphids, leafminers, and thrips have been intercepted in exported lettuce shipments. Such shipments are typically rejected by the prospective importer.

At home, U.S. consumers are also increasingly savy about the negative health consequences associated with pesticide use and thus, there is currently an increase in demand for pesticide free and organically produced agricultural products among U.S. consumers.

Therefore, in one aspect, the invention provides non-toxic methods for post harvest control of pest populations on agricultural commodities which does not injure the commodities nor compromise their quality. The method comprises placing the agricultural commodities in a controlled temperature environment and exposing them to an ultra-low oxygen (ULO) conditions for a length of time sufficient to kill the pests and without injuring to the commodities.

Prior to the present disclosure of Ultra-Low Oxygen (ULO) treatment for agricultural commodities, there was no alternative to fumigation with methyl bromide and other toxic chemicals for the post harvest control of agricultural pests. Therefore in the past, exported agricultural commodities were subject to unnecessary import expenses and/or injury due to a need for fumigation. As a result, shipments of all types of agricultural commodities could be regularly rejected at the port of entry, thereby costing U.S. agricultural producers millions of dollars in lost revenue.

Fortunately, the methods disclosed herein provide a cost effective, healthful and environmentally friendly alternative to the use of chemical fumigants and other harmful and toxic methods of post harvest pest control on agricultural products. Thus, the disclosed methods for post harvest pest control treatments provide for increased exports of U.S. agricultural produce, increased domestic customer satisfaction due to fewer concerns regarding food safety, and generally are a benefit to U.S. agriculture.

II. Ultra-Low Oxygen Conditions

Post harvest treatment of agricultural commodities under conditions of ultra-low oxygen as disclosed herein, provides effective non-chemical quarantine and post harvest control strategies for fresh and stored agricultural commodities. The methods disclosed herein and their equivalents, provide for reduced losses caused by insects and other arthropods, and agricultural pests generally. The disclosed methods thus result in reduced use of chemical pesticides, decreased environmental contamination, improved product quality, expanded export markets.

As is known in the art, ambient air is typically about 0.3% $CO_2$, 20% $O_2$ and 78% $N_2$ with remaining 1.7% comprised of many other gases. Typically when referring to a condition of ultra-low oxygen (ULO) one is referring to conditions wherein the oxygen concentration in the atmosphere is generally less than or equal to about 1%. In some embodiments ULO is about 0.05%, about 0.025%, about 0.024%, about 0.023%, about 0.022%, about 0.021%, about 0.02%, about 0.019%, about 0.018%, about 0.017%, about 0.016%, about 0.015%, about 0.014%, about 0.013%, about 0.012%, about 0.011%, about 0.01%, about 0.009%, about 0.008%, about 0.007%, about 0.006%, about 0.005%, about 0.004%, about 0.003%, about 0.002%, about 0.001%, about 0.0009%, about 0.0008%, about 0.0007%, about 0.0006%, about 0.0005%, about 0.0004%, about 0.0003%.

In exemplary embodiment the invention provides an Ultra-low oxygen (ULO) treatment for post harvest pest control on agricultural commodities. Typically, the treatment comprises exposing subject commodities to a specified ULO condition for prescribed length of time under certain temperature to kill target pests without injury to the commodities.

The ULO environment can be created by any means known in the art for creating controlled atmosphere environments e.g., by flushing an enclosed space with air comprising a ULO concentration.

In one embodiment, the ULO environment is created in a sealed space e.g., a room, container, or other enclosure, that is filled with fresh commodities to be treated. Typically the space is first flushed with nitrogen gas (from high pressure cylinders or nitrogen generator) to reduce oxygen levels. Breathing of commodities also helps to reduce oxygen level.

Agricultural commodities continue what is known as "respiration", post harvest utilizing oxygen thus, giving off $CO_2$, after harvesting. The rate of respiration can fluctuate widely, and is affected greatly by temperatures and oxygen levels in the atmosphere around the products. An oxygen analyzer is used to monitor oxygen level in the space. Once oxygen level falls below a set point, ambient air or nitrogen with certain level of oxygen, will be released into the space to compensate oxygen consumption by the commodities. Thereby, a desired ULO condition will be maintained in the space. An air circulation system or apparatus is used to circulate air in the space. The oxygen in the space is kept for prescribed length of time under certain temperature to complete an ULO treatment for insect control.

In an exemplary embodiment, ULO treatment is conducted in shipping containers during transit. In one embodiment the containers filled with iced broccoli are flushed with nitrogen gas to reduce oxygen level before containers are shipped. After ULO treatment, oxygen level is returned to the level for the normal storage (see e.g., *Postharvest Technology*, University of California, Div. of Agric. & Nat. Resources Publication 3311 supra, and Hardenburg, R. et al. (1986) *The Commercial Storage of Fruits, Vegetables, and Florist and Nursery Stocks*. USDA Agric. Hdbk No. 66.). This treatment can also be conducted before shipping in controlled atmosphere. Alternatively, fresh broccoli can be treated at higher temperature immediately after harvest. After treatment, broccoli will then be cooled, injected with ice, and shipped.

In other exemplary embodiments, ULO treatment for thrips control also kills all aphids and is effective against other agricultural pests e.g., mites, scale, etc. . . . . The treatment is also used on other commodities that can tolerate the treatment for control of thrips or other pests e.g., squash, fruits, nursery stocks, cut flowers etc. . . . . .

III. Controlled Temperature Environments

The temperature of the environment in which the agricultural commodity resides for treatment is controlled to effect killing of pests within a chosen time period.

Typically, when carrying out the disclosed methods, the temperature of the environment in which the agricultural commodities reside is varied within a relatively wide range thus accommodating the needs of a wide range of agricultural commodities in need of treatment. Typically, the process is carried out at temperatures that are in a range that is between about 0° C. and about 30° C. In an exemplary embodiment the temperature is maintained in a range that is between about 1° C. and about 15° C. In an exemplary embodiment the temperature is maintained in a range that is between about 2° C. and about 12° C. In an exemplary embodiment the temperature is maintained in a range that is between about 1° C. and about 10° C. In other exemplary embodiments the temperature is maintained at about 2° C., 3° C., 4° C., 5° C., 6° C., 7° C., 8° C., 9° C., 11° C., 13° C., 14° C., 16° C., 17° C., 18° C., 19° C., 20° C., 21° C., 22° C., 23° C., 24° C., 25° C., 26° C., 27° C., 28° C., or 29° C.

Methods for controlling the environmental temperature in an enclosed space are well known in the art. Many examples can be found in the patent database see e.g., U.S. Pat. No. 6,955,056 and/or U.S. Pat. No. 6,959,559.

IV. Containers

For purposes of practicing the methods disclosed herein and their equivalents, a sealed enclosure capable of generating and maintaining a controlled atmosphere is typically used. The nature of the enclosure is not important, all that is needed is an enclosure in which the internal atmospheric conditions can be controlled. For example the enclosure may be any enclosure known e.g., a box, a sphere, a room, a truck, a trailer, a semitrailer, a boat, a barge, a railroad car, an aircraft, any imaginable enclosure that provides an enclosed space wherein the atmosphere inside the enclosure can be controlled.

In order to create and/or maintain ULO conditions the amount of oxygen present in the atmosphere is controlled. Means for controlling and sensing the amount of oxygen present in a container are known in the art. See e.g., U.S. Pat. No. 5,451,248; U.S. Pat. No. 5,333,394; and U.S. Pat. No. 5,623,105. Any known method can be used. In other embodiments, the amount of substances other that $O_2$ e.g., carbon dioxide and ethylene etc. . . . that may be present initially in the enclosure are sensed and controlled (but not necessarily eliminate). Left unattended some substances increase in concentration over time within the enclosure, for example carbon dioxide and any ethylene which might be formed by the produce respiring and/or ripening produce in situ in the container.

In one embodiment, the container/enclosure is initially flushed with an inert gas, e.g., nitrogen or a mixture of, for example, nitrogen and oxygen. Typically the flushing is carried out to facilitate the start of atmospheric control to ensure that the selected amounts of oxygen and carbon dioxide are established either by the removal or the addition (or both) of these components.

In some embodiments, the container may be initially filled with air and the atmosphere control is such that the system progressively reduces the oxygen content.

Since fruits and vegetables continue to respire after harvest thereby consuming oxygen and producing carbon dioxide, maintaining the selected atmospheric conditions typically utilizes a means for monitoring the oxygen and carbon dioxide levels in the enclosure/container. Any means known in the art are suitable for such purposes. In an exemplary embodiment, monitoring of the carbon dioxide and oxygen levels of the controlled atmosphere system is facilitated by including a sampling pump into the container design which is used to draw conditioned air from the transport/storage/shipping container into carbon dioxide and oxygen sensing devices. Thus, in one embodiment the container used for post harvest control of pests comprises a sensor that responds to the oxygen concentration inside the container. In one embodiment the oxygen sensor is integrated into an automatic feedback control.

In an exemplary embodiment, the oxygen sensor is set respond to when the oxygen concentration reaches set threshold levels. Typically, the threshold level is set at the lower limit of the oxygen concentration for a given ULO condition. When the oxygen concentration in the container reaches the threshold limit a mechanism responsive to the sensor triggers the release of air or nitrogen gas with certain level of oxygen into the container to compensate for oxygen consumption by the subject commodity. Sensors capable of triggering a mechanical response are known in the art. See e.g., U.S. Pat. No. 5,964,089 which discloses a controller for controlling the hydrogen delivery system to supply hydrogen to the vehicle exhaust system and the internal combustion engine. The controller comprises an output electrically connected to the hydrogen delivery system for sending a signal to the hydrogen delivery system to release hydrogen to the vehicle exhaust system and the internal combustion engine.

In exemplary embodiments the invention also provides timers that permit final adjustment of the atmospheric conditions after the completion of the ULO treatment. In an exemplary embodiment, the atmospheric conditions are adjusted to maintain appropriate storage and or shipping conditions for a given agricultural commodity. Determining the particular storage conditions for a given agricultural commodity is well known and readily determined by one of skill in the art. See e.g., Hardenburg, R. E., A. E. Watada and C. Y. Wang. (1986) *The Commercial Storage of Fruits, Vegetables, and Florist and Nursery Stocks.* USDA-ARS Agriculture Handbook Number 66 (revised).

In another exemplary embodiment, the container comprises a carbon dioxide adsorbent such as sodalime which functions to keep carbon dioxide concentrations low, e.g., less than 1%, thereby providing protection for those commodities that are susceptible to carbon dioxide injury.

Thus, in one aspect, the invention provides a system for controlling the atmosphere of a container for use in the post harvest disinfection and subsequent or concomitant storage and/or transportation of agricultural commodities. The system comprises means for removing or controlling at least one atmosphere component and simultaneously effecting circulation of the controlled atmosphere in the container. The controller comprises an analyzer for carbon dioxide ($CO_2$) analysis, an analyzer for oxygen ($O_2$) analysis, a means to calibrate these analyzers, and a means to circulate sample gases and calibrant gases through these analyzers. Also provided are a gas source of controlled atmosphere gas.

Thus, the present invention provides a convenient, cost effective and economical way of disinfecting agricultural commodities within an enclosed space. In one embodiment, a quantity of the agricultural commodity is placed in a controlled atmosphere container to provide a controlled atmosphere shipping unit comprising a controlled atmosphere container with the quantity of product therein.

V. Measuring the Quality of Agricultural Commodity

Quality of treated agricultural commodities can be measured by any means known in the art. See e.g., Lipton, W. J. (1980) HortScience 15:64-66; Abbott, J. A. (1999). Postharv. Biol. Technol. 15:207-225; Anon. Various dates. U.S. Standards for Grades of Fresh Fruits and Vegetables. U.S. Department of Agriculture, Food Safety and Quality Service, Washington, D.C.; Chen, P. and Z. Sun. (1991) J. Agr. Eng. Res. 49:85-98; Kader, A. A. ed. (2002) Univ. of Calif., Div. of Agric. & Nat. Resources. Special Publ. 3311, third edition, 535 p. (Chapters 22 & 23).

In an exemplary embodiment, the quality of treated agricultural commodities is measured by visual appearance and is examined for the presence of any injuries by low oxygen or increased carbon dioxide after 2 weeks of post-treatment storage. In an exemplary embodiment broccoli, is examined for any color change (from dark green to yellow), opening of beads, and/or off-odor development. In another exemplary embodiment the heart leaves of lettuce are examined.

In another exemplary embodiment, the quality of nursery stock treated by the methods of the invention is measured by measuring viability of the stock after treatment.

VI. Pests Controlled by ULO Treatment

In one aspect, the invention is used for post harvest control of a variety of important agricultural pests including, but not limited to the following exemplary arthropods:

Hemipteran pests including Homopteran pests e.g.: Delphacidae (planthoppers) [e.g. *Laodelphax striatellus* (small brown planthopper), *Nilaparvata lugens* (brown planthopper) and *Sogatella furcifera* (white-backed rice planthopper)], Deltocephalidae (leafhoppers) [e.g. *Nephotettix cincticeps* and *Nephotettix virescens*], Aphididae (aphids) [e.g. *Nasonovia ribisnigri* (lettuce aphid), *Aphis gossypii* (cotton aphids), *Myzus persicae* (green peach aphid), *Aphis citricola*, *Lipaphis pserudobrassicae* (turnip aphid), *Nippolachnus piri*, *Toxoptera aurantii* (black citrus apid) and *Toxoptera ciidius* (brown citrus apid)], stink bugs [e.g. *Nezara antennata* (green stink bug), *Cletus punctiger*, *Riptortus clavetus* (bean bug) and *Plautia stali* (oriental stink bug)], Aleyrodidae (whiteflies) [e.g. *Trialeurodes vaporariorum* (greenhouse whitefly), *Bemisia tabaci* (sweetpotato whitefly) and *Bemisia argentifolli* (silverleaf whitefly)], scales [e.g. *Aonidiella aurantii* (California red scale), *Comstockaspis perniciosa* (San Jose scale), *Unaspis citri* (citrus snow scale), *Pseudaulacaspis pentagona* (white peach scale), *Saissetia oleae* (brown olive scale), *Lepidosaphes beekii* (purple scale), *Ceroplastes rubens* (red wax scale) and *Icerya purchasi* (cottonycushion scale)], Tingidae (lace bugs) and Psyllidae (suckers) *Pseudococcus fragilis* (Citrophilus Mealybug): *Planococcus citri* (Citrus Mealybug); *Pseudococcus maritimus* (Grape Mealbug); *Rhizoecus fakifer* (Ground Mealybug); *Phenacoccus gossypii* (Mexican Mealybug); *Pseudococcus solani* (Solanum Mealybug); vine mealybug (*Planococcus ficus*).

Lepidopteran pests e.g.: Pyralidae [e.g. *Chilo suppressalis* (rice stem borer), *Cnaphalocrocis medinalis* (rice leafroller), *Ostrinia nubilalis* (European cornborer), *Parapediasia teterrella* (bluegrass webworm), *Notarcha derogata* (cotton leafroller) and *Plodia interpunctella* (Indian meal moth)], Noctuidae [e.g. *Spodoptera litura* (tobacco cutworm), *Pseudaletia separata* (rice armyworm), *Mamestra brassicae* (cabbage armyworm), *Agrotis ipsilon* (black cutworm), *Trichoplusia* spp., *Heliothis* spp. and *Helicoverpa* spp.], Pieridae [e.g. *Pieris rapae*], Tortricidae [e.g. *Adoxophyes* spp., *Grapholita molesta* (oriental fruit moth) and *Cydia pomonella*], Carposimidae [e.g. *Carposina niponensis* (peach fruit moth)], Lyonetiidae [e.g. *Lyonetia* spp.], Lymantriidae [e.g. *Lymantria* spp. and *Euproctis* spp.], Yponameutidae [e.g. *Plutella xylostella*], Gelechiidae [e.g. *Pectinophora gossypiella* (pink bollworm)], Arctiidae (tiger moths) [e.g. *Hyphantria cunea* (fall webworm)] and Tineidae [e.g. *Tinea translucens* (casemaking clothes moth) and *Tineola bisselliella* (webbing clothes moth)]; Dipteran pests e.g., *Culex* spp. [e.g. *Culex pipiens pallens* and *Culex tritaeniorhynchus*], *Aedes* spp. [e.g. *Aedes aegypti* and *Aedes albopictus*], *Anopheles* spp. [e.g. *Anopheles sinensis*], Chironomidae (midges), Muscidae [e.g. *Musca domestica* (housefly), *Muscina stabulans* (false housefly) and *Fannia* spp. (little house flies)], Calliphoridae, Sarcophagidae, Anthomyiidae [e.g. *Delia platura* (seedcorn maggot) and *Delia antiqua* (onion maggot)], Tephritidae (fruit flies), Drosophilidae (vinegar flies), Psychodidae (sand flies), Simuliidae (black flies), Tabanidae, and Agromyzidae (leafininer flies); e.g., *Liriomyza langei*.

Thysanopteran pests e.g.: *Thrips palmi*, *Thrips tabaci*, *Thrips hawaiiensis* (flower thrips), *Scirtothrips dorsalis* (yellow tea thrips), *Frankliniella intonsa* (flower thrips), *Frankliniella occidentalis* (western flower thrips) and *Ponticulothrips diospyrosi*; Acarina such as Tetranychidae (spider mites) [e.g. *Tetranychus urticae* (two-spotted spider mite), *Tetranychus kanzawai* (Kanzawa spider mite), *Panonychus citri* (citrus red mite), *Panonychus ulmi* (European red mite) and *Oligonychus* spp.], Eriophyidae [e.g. *Aculops pelekassi* (pink citrus rust mite) and *Calacarus carinatus* (purple tea mite)], Tarsonemidae [e.g. *Polyphagotarsonemus latus*], Tenuipalpidae (false spider mites), Tuckerellidae, Ixodidae [e.g. *Haemaphysalis japonica* (Japanese tick), *Haemaphysalis flava* (yellow tick), *Haemaphysalis longicornis*, *Boophils microplus*, *Ixodes ovatus* and *Ixodes persulcatus*], Acaridae [e.g. *Tyrophagus putrescentiae* (copra mite)], Dermanyssidae [e.g. *Dermatophagoides farinae* (American house dust mite),

*Dermatophagoides ptrenyssnus*], Cheyletidae [e.g. *Cheyletus eruditus, Cheyletus fortis, Cheyletus malaccensi* and *Cheyletus moorei*] and chicken mites]; and Nematoda e.g., *Pratylenchus coffeae* (coffee root-lesion nematode), *Pratylenchus fallax, Pratylenchus loosi, Pratylenchus vulnus* (walnut root-lesion nematode), *Heterodera glycines* (soybean cyst nematode), *Globodera rostochiensis* (potato cyst nematode), *Meloidogyne hapla* (northern root-knot nematode) and *Meloidogyne incognita* (southern root-knot nematode).

Beetles e.g., Colorado potato beetle.

EXAMPLES

Example 1

Ultra-Low Oxygen (ULO) Treatment for Control of Western Flower *Thrips* on Broccoli Western flower thrips are a common pest on a wide variety plants and is quarantined or restricted on some overseas markets e.g., Taiwan and Japan. The pest problem affects export of U.S. broccoli because the cost for the required fumigation treatment at the port of entry is often prohibitive.

Typically, broccoli is shipped on ice at low temperature. Unfortunately, chemical fumigation is conducted at ambient temperature and therefore is not compatible with typical shipping methods of broccoli. Furthermore, the common fumigant methyl bromide causes ozone depletion and its production is to be phased out. As the following Example illustrates, Western flower thrips were successfully controlled using ultra-low oxygen treatment at different temperatures.

In one experiment, thrips were completely controlled at low temperature (1° C.), with ULO treatment at 0.003% oxygen in 5 days (Table 1). In another experiment, commercial broccoli was treated for periods of either 6 or 10 days at 1° C. in metal drum containers. Controlled atmosphere conditions were established as described below in Example 2. A fan was placed above the broccoli to circulate the air. An oxygen analyzer (Model 810, Illinois Instruments Inc. Johnsburg Ill.) was used to monitor oxygen levels in the treatment chamber. Oxygen levels were reduced by flushing the chambers with nitrogen gas comprising about 0.1% oxygen from a nitrogen generator (Balston 75-7820, Parker Hannifin Co. Tewksbury Mass.). Results are shown in Table 1.

TABLE 1

Effects of oxygen level and treatment time on mortality of western flower thrips at low temperature (1° C.)

| $O_2$ (%) | Time (day) | N | Mortality (Mean ± SE) (%) |
|---|---|---|---|
| 0.003 | 2 | 153 | 55.89 ± 6.27 |
| 0.003 | 3 | 151 | 87.37 ± 2.19 |
| 0.003 | 4 | 147 | 99.41 ± 0.60 |
| 0.003 | 5 | 130 | 100 |
| Control | 5 | 70 | 14.71 ± 6.16 |
| Control | 6 | 83 | 21.67 ± 4.09 |
| Control | 10 | 63 | 47.14 ± 6.36 |
| Treatment in Metal Drum Containers | | | |
| .030 | 6 | 138 | 85.7 ± 5.7 |
| .023 | 10 | 97 | 100 |

No negative effects on broccoli quality were detected.

*Thrips* are also controlled in shorter time periods at higher temperatures. For example, a two day ULO treatment with 0.004% at 10° C. also effectively kills thrips (FIG. 1).

Figure 2:
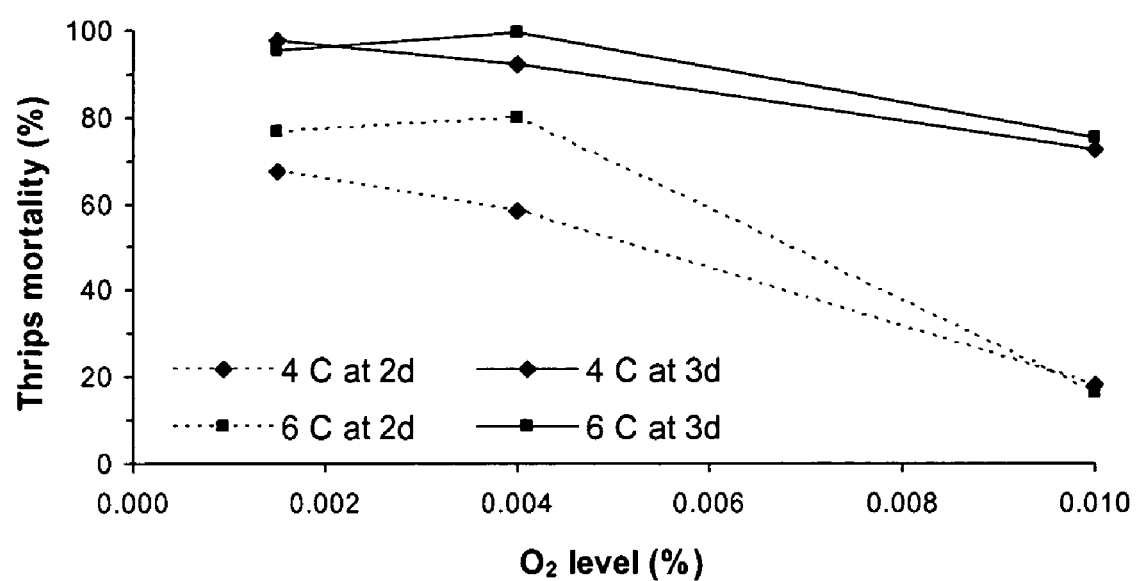
FIG. 2 An exemplary embodiment showing effects of $O_2$ levels on thrips mortality in 2 and 3 day Ultra-Low Oxygen (ULO) treatment at 4° C. and 6° C.

Thrips were also subjected to ULO treatments with different oxygen levels for two and three days at 4 and 6° C. Mortality rate increased as oxygen concentration decreased and as shown in FIG. 2 reached a stable level at 0.004% of $O_2$.

In some exemplary embodiments, oxygen levels for effective ULO treatment are less than about 0.01% $O_2$ and in some exemplary embodiments are about $\leq 1.005\%$ (50 ppm) $O_2$. Thus, in one exemplary embodiment, effective low temperature ULO treatment for thrips control on broccoli comprises $\leq 5$ day ULO treatment with $\leq 0.005\%$ (50 ppm) $O_2$. In another exemplary embodiment, effective low temperature ULO treatment for thrips control on broccoli comprises <0.01% $O_2$ at zero to 2° C. As shown in the Example, treatment can be shortened with increasing temperature e.g., two day ULO treatment with $\leq 0.005\%$ (50 ppm) at $\geq 10°$ C.

Example 2

Ultra-Low Oxygen Treatment for Postharvest Control of *Nasonovia Ribisnigri* (Homoptera: Aphididae) on Iceberg Lettuce The lettuce aphid, *Nasonovia ribisnigri*, is a common pest of lettuce in the United States. Ultra-low oxygen treatments were studied for control of the insect on iceberg lettuce. Small-scale ultra-low oxygen treatments in plastic jars were conducted at 1, 5, and 10° C. for different durations to determine effective treatment against nymphs and alates of *N. ribisnigri*. As shown in Table 2, at oxygen levels of 0.015-0.025%, *N. ribisnigri* can be controlled in 3 days at 1° C., 2 days at 5° C., and 1 day at 10° C. Large-scale ultra-low oxygen treatments were conducted in bulk container treatment chambers with commercial iceberg lettuce heads for two days at 6° C. with oxygen levels of 0.015% and 0.025% and for three days at 3° C. with oxygen level of 0.015%. All treatments achieved complete control of *N. ribisnigri*. No negative impact on lettuce quality was detected after two weeks of post-treatment storage.

TABLE 2

Mortality of *N. ribisnigri* nymphs and alates in response to ultra-low oxygen treatments with different oxygen levels and durations at different temperatures
(Liu, Y. B. (2005) J. Econ. Entomol. 98: 1899-1904)

| Temp (° C.) | Time (day) | $O_2$ (%) | Nymph mortality N | Nymph Mean ± SE (%) | Alate mortality N | Alate Mean ± SE (%) |
|---|---|---|---|---|---|---|
| 1 | 1 | 0.015 | 114 | 71.7 ± 8.2 | 73 | 79.5 ± 9.4 |
|   |   | 0.025 | 100 | 63.7 ± 2.9 | 55 | 63.1 ± 6.9 |
|   | 2 | 0.015 | 222 | 95.1 ± 2.6 | 143 | 98.1 ± 1.3 |
|   |   | 0.025 | 167 | 95.9 ± 1.9 | 101 | 97.3 ± 1.7 |
|   | 3 | 0.015 | 213 | 100 | 110 | 100 |
|   |   | 0.025 | 172 | 99.4 ± 0.6 | 84 | 98.7 ± 1.3 |
| 5 | 1 | 0.015 | 178 | 89.9 ± 2.4 | 115 | 76.1 ± 8.0 |
|   |   | 0.025 | 177 | 92.0 ± 2.3 | 102 | 85.5 ± 5.7 |
|   | 2 | 0.015 | 236 | 100 | 131 | 100 |
|   |   | 0.025 | 212 | 100 | 125 | 94.4 ± 3.1 |
|   | 3 | 0.015 | 201 | 100 | 134 | 100 |
|   |   | 0.025 | 96 | 100 | 65 | 100 |
| 10 | 1 | 0.015 | 191 | 99.5 ± 0.5 | 111 | 100 |
|   |   | 0.025 | 169 | 100 | 114 | 100 |

The average mortality rates of *N. ribisnigri* nymphs and alates in pooled controls were 9.9% and 11.7% respectively.

Materials and Methods for Example 2

Insects. *N. ribisnigri* colonies were established from field collected insects in 2001 and were reared on lettuce plants in screen cages in a greenhouse. *N. ribisnigri* newly collected in 2003 were added to the colonies. For each test, apterous *N. ribisnigri* were placed on lettuce leaf pieces in plastic Petri dishes (5.5 cm diam, ≈15 aphids per Petri dish) and the Petri dish tops were secured to the bottoms with tape. The Petri dishes had narrow spaces between the tops and the bottoms that permit ventilation. Alates were collected in plastic vials (2.5 cm diam.×7 cm high, 10-15 alate/vial) containing a piece of lettuce leaf using a vacuum powered aspirator. The vials were sealed with lids with screened windows for ventilation.

Effects of small-scale ultra-low oxygen treatments on insect survival. Ultra-low oxygen conditions were established in large drum chambers filled with lettuce by intermittently releasing $N_2$ and air into the chambers. The ultra-low oxygen atmosphere was circulated using an air pump through a series of plastic jars with insects for desired time intervals to accomplish ultra-low oxygen treatments.

Commercial iceberg lettuce heads from supermarkets were placed in large treatment chambers modified from metal drums (76 liters). A paper bag with 100 g sodasorb (Grace & Co., Atlanta, Ga.) was added in each drum to absorb carbon dioxide. A 12VDC circulation fan was set up in each drum to mix air constantly. The drums were sealed with lids and bolt-rings and placed in refrigerators that were equipped with external temperature controllers to set precise temperatures and 12 VDC fans inside to circulate air constantly. Nitrogen gas with about 0.1% $O_2$ was supplied from a nitrogen generator (Balston 75-7820, Parker Hannifin Co., Tewksbury, Mass.) and stored in a compression tank. The nitrogen was released into the metal drum chambers through the inlets on the lids and the inlets were extended to the bottom of the drum chambers. The outlets of the chambers were piped into a 32 cm column of water to maintain about 3.6 kPa (0.5 psi) positive pressure in the drum chambers. Each lid had a third port linked to an oxygen analyzer (Series 800, Illinois Instruments, Inc., Johnsburg, Ill.).

Flowmeters were used to regulate flow rates of nitrogen to the drums. Solenoid valves controlled by programmable timers (ChronTrol XT, ChronTrol Corp., San Diego, Calif.) were used to control flow of nitrogen to the drums and flows of air from drums to the oxygen analyzer. Nitrogen was released to drums intermittently (10-20 sec every 10 min depending on treatments). Respiration of lettuce reduced oxygen levels in the treatment chambers. Oxygen levels for treatments were controlled by adding air into the nitrogen gas stream once the oxygen level in a drum fell below a set threshold and triggered the alarm relay of the oxygen analyzer. Desired ultra-low oxygen CA was maintained by a combination of intermittent releasing of nitrogen with low level of oxygen into the treatment drums, consumption of oxygen by lettuce, and adding air based on feedback control of the oxygen analyzer. Carbon dioxide levels in the drums were monitored periodically with a carbon dioxide analyzer (Model 302M, Nova Analytical Systems, Inc., Niagara Falls, N.Y.) and were typically kept below 0.2%.

To conduct small-scale ultra-low oxygen treatments against *N. ribisnigri*, one or more plastic jars (≈1 liter) with insects and an air pump (SP6000, Smart Products, Inc., Morgan Hill, Calif.) were linked in series with nylon tubing (1.6 mm ID) and linked to the inlet and outlet ports of a drum chamber. Each jar had 2-3 Petri dishes with *N. ribisnigri* nymphs and 2 vials with *N. ribisnigri* alates together with one vial with a moist paper towel for treatment. The jars were sealed with lids. Each lid had two ports. For treatments with different durations, several jars were linked in a series. The air pump was linked to the one end of the jar series and circulated air from the drum with desired oxygen level through the jars.

The treatments were started by purging air out of jars with nitrogen for at least 10 min and then connecting the jars and the air pump to the large drum. This allowed establishment of desired ultra-low oxygen levels quickly in the jars for the treatments. To end a treatment at different time intervals, a jar was disconnected from the series and the tubing was quickly reconnected to allow air circulation while the air pump was turned off. The positive air pressures in the drums prevented outside air from getting into the system.

Four drum chambers were set up in two refrigerators to conduct ULO treatments. Two oxygen levels, 0.015% and 0.025%, were tested simultaneously at two different temperatures. Three temperatures, 1, 5, and 10° C. with variation of ±0.5° C., were used in this study. ULO treatments at 1 and 5° C. lasted for 1, 2, and 3 days respectively and ULO treatments at 10° C. lasted only one day. Treatment was replicated 2-3 times for any combination of treatment time, temperature, and oxygen level. Petri dishes with nymphs and plastic vials with alates were held as controls in the refrigerators in ziplock bags with ventilation holes (4 holes of 1 cm diam. for each bag) containing moist paper towels. A total of 14 treatment combinations were tested against >2500 nymphs and >1500 alates of *N. ribisnigri* in the small-scale ULO treatments.

After each treatment, jars were kept in an environmental chamber at 24° C. and 14:10 (L:D) photoperiod for one day. Insect mortality was then scored under a magnifying glass or dissection scope. Insects that failed to move appendages in response to repeated probing with a soft brush were classified as dead. Moribund aphids that moved appendages but failed to walk normally were provided fresh leaf pieces and incubated for one more day before they were evaluated again for survivorship.

Example 3

Ultralow Oxygen Treatment for Vine Mealybug Control on Grape Rootstocks

Butternut squashes infested with vine mealybugs were confined in cardboard box and placed in treatment chambers made of plastic containers together with dormant grape rootstocks. Different combinations of oxygen level, temperature, and treatment time were tested. After each test, the squash was kept in an environmental chamber for one day before scoring mortality of vine mealybug. Mortality of all life stages: egg, crawler, nymph, and adult were determined. Eggs were collected from the treated squash and placed in vials. They were checked periodically over time to check the presence of crawlers from hatched eggs. Crawlers, nymphs, and adults were removed from the surface of the squash and checked for mortality under a microscope. ULO treatment with 10 ppm (0.001%) oxygen at 20° C. for 3 days was effective in controlling all life stages of vine mealybug. This treatment was replicated 3 times. Rootstocks from 8 grape cultivars (6 wine grapes and 2 table grapes) were tested. For the ULO treatment that controlled all life stages of vine mealybug, the rootstocks were planted individually in pots in a greenhouse together with untreated controls. All rootstocks germinated and grew normally. There were no detectable difference between ULO treated rootstocks and the untreated controls in growth.

Example 4

**Postharvest Control of Western Flower *Thrips* and Lettuce Aphid on Iceberg Lettuce Using Sequential Controlled Atmosphere Storage and Ultralow Oxygen Treatment**

Iceberg lettuce that was stored under either normal cold condition or under a controlled atmosphere comprising 3% oxygen for one week (CA-ULO condition), was subjected to ULO treatments with 30 ppm (0.003%) oxygen for 2 days at 10° C. These treatments killed all thrips without injury to lettuce. Fresh lettuce without pre-treatment storage was also subjected to the same ULO treatment for comparison. ULO treatment caused injuries to heartleaves of fresh lettuce but did not cause any injury to lettuce that was stored for one week prior to ULO treatment.

The CA-ULO condition (storing at 3% oxygen at 2° C. for 7 days then ULO treatment with 0.003% oxygen for 2 days at 10° C.) was further tested in large scale tests. In addition to western flower thrips, lettuce aphid was also included in the tests. The CA-ULO condition followed by ULO treatment as described above killed all thrips and lettuce aphid and did not affect lettuce quality.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of controlling pest populations on agricultural commodities without injury to the commodities, the method consisting essentially of:
   (a) placing said commodities in an enclosure capable of generating and maintaining a controlled atmosphere and a controlled temperature environment, wherein the temperature in the controlled temperature environment is in a range of between about 0° C. to about 30° C.; and
   (b) flushing the enclosure with an inert gas to initiate ultra-low oxygen conditions, thereby exposing said commodities to ultra-low oxygen conditions, wherein the ultra-low oxygen conditions comprise conditions wherein the oxygen ($O_2$) concentration of the atmosphere is in a range that is between about 0.0003% $O_2$ to about 0.03% $O_2$ for a length of time sufficient to kill the pests without injury to the commodities.

2. The method of claim 1, wherein the pest is a member selected from the group consisting of Hemipteran pests, Homopteran pests, Lepidopteran pests, Dipteran pests, Thysanopteran pests, Nematoda, and beetles or a combination of such members.

3. The method of claim 1, wherein the pest is a member selected from the group consisting of *Nasonovia ribisnigri*, *Liromyza langei*, *Frankliniella occidentalis* (Western flower thrips), white flies, scale, and mealy bugs, or a combination of such members.

4. The method of claim 1, wherein the ultra-low oxygen conditions comprise an oxygen concentration in a range between about 0.0003% to about 0.02%.

5. The method of claim 1, wherein the ultra-low oxygen conditions comprise an oxygen concentration in a range between about 0.0005% to about 0.01%.

6. The method of claim 1, wherein the ultra-low oxygen conditions comprise an oxygen concentration that is a member selected from the group consisting of about 0.0003% $O_2$, about 0.0004% $O_2$, about 0.0005% $O_2$, about 0.0006% $O_2$, about 0.0007% $O_2$, about 0.0008% $O_2$, about 0.0009% $O_2$, about 0.001% $O_2$, about 0.002% $O_2$, about 0.003% $O_2$, about 0.004% $O_2$, about 0.005% $O_2$, about 0.006% $O_2$, about 0.007% $O_2$, about 0.008% $O_2$, about 0.009% $O_2$, about 0.01% $O_2$, about 0.011% $O_2$, about 0.012% $O_2$, about 0.013% $O_2$, about 0.014% $O_2$, about 0.015% $O_2$, about 0.016% $O_2$, about 0.017% $O_2$, about 0.018% $O_2$, about 0.019% $O_2$, about 0.02% $O_2$, about 0.021% $O_2$, about 0.022% $O_2$, about 0.023% $O_2$, about 0.024% $O_2$, and about 0.025% $O_2$.

7. The method of claim 1, wherein a temperature in a range between about 0° C. to about 30° C. is maintained in the controlled temperature environment.

8. The method of claim 1, wherein a temperature in the controlled temperature environment is a member selected from the group consisting of about 0° C., about 1° C., about 2° C., about 3° C., about 4° C., about 5° C., about 6° C., about 7° C., about 8° C., about 9° C., about 10° C., about 11° C., about 12° C., about 13° C., about 14° C., about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., and about 30° C.

9. The method of claim 1, wherein the agricultural commodities are treated for a time period in a range between about 1 day to about 7 days.

10. The method of claim 1, wherein the agricultural commodities are treated for a time period that is a member selected from the group consisting of about 1 day, about 2 days, about 3 days, about 4 days, about 5 days, about 6 days, and about 7 days.

11. The method of claim 1, wherein the agricultural commodity is a member selected from the group consisting of vegetables, fruits, tubers, cut flowers, flowering plants and nursery stocks or a combination of such members.

12. The method of claim 11, wherein the agricultural commodity is a nursery stock.

13. The method of claim 12, wherein the nursery stock is grape rootstock.

14. The method of claim 13, wherein the nursery stock is grape rootstock, and wherein the pest population is a population of mealybugs.

15. The method of claim 14, wherein the population of mealybugs is a population of vine mealybugs.

16. The method of claim 15, wherein the grape rootstock is placed in a controlled temperature environment at a temperature of about 20° C.; and wherein the ultra-low oxygen conditions comprise an oxygen concentration of about 0.001% $O_2$ for a time period of about 3 days.

17. The method of claim 11, wherein the agricultural commodity is a vegetable that is a member selected from the group consisting of broccoli and lettuce, or a combination of such members.

18. The method of claim 17, wherein the pest population is a population of *Frankliniella occidentalis* (Western flower thrips).

19. The method of claim 18, wherein the agricultural commodity is lettuce.

20. The method of claim 18, wherein the lettuce is stored for about one week prior to being placed in a controlled temperature environment, and wherein the lettuce is then placed in a controlled temperature environment at a temperature of about 10° C.; and wherein the ultra-low oxygen conditions comprise an oxygen concentration of about 0.003% $O_2$ for a time period of about 2 days.

21. The method of claim 20, wherein the lettuce is stored for about one week under conditions that are members selected from the group consisting of a normal cold condition and a controlled atmosphere condition comprising 1% to about 5% $O_2$.

22. The method of claim 18, wherein the agricultural commodity is broccoli.

23. The method of claim 22, wherein
   (i) the broccoli is placed in a controlled temperature environment at a temperature that is in a range of between about 0° C. to about 10° C.; and wherein
   (ii) the ultra-low oxygen conditions comprise an oxygen concentration that is in a range of between about of about 0.003% $O_2$ to about 0.01% $O_2$;
   for a time period of between about 1 day to about 6 days.

24. The method of claim 22, wherein the broccoli is placed in a controlled temperature environment at a temperature of about 1° C.; and wherein the ultra-low oxygen conditions comprise an oxygen concentration of about 0.003% $O_2$ for a time period of about 5 days.

25. The method of claim 22, wherein the broccoli is placed in a controlled temperature environment at a temperature of about 10° C.; and wherein the ultra-low oxygen conditions comprise an oxygen concentration of about 0.004% $O_2$ for a time period of about 2 days.

26. The method of claim 17, wherein the agricultural commodity is lettuce, and the pest population is a population of *Nasonovia ribisnigri*.

27. The method of claim 26, wherein
   (i) the lettuce is placed in a controlled temperature environment at a temperature that is in a range of between about 1° C. to about 10° C.; and wherein
   (ii) the ultra-low oxygen conditions comprise an oxygen concentration that is in a range of between about of about 0.015% $O_2$ to about 0.025% $O_2$;
   for a time period of between about 1 day to about 5 days.

28. The method of claim 27, wherein the lettuce is placed in a controlled temperature environment wherein
   (i) the temperature is a temperature selected from the group consisting of a temperature of about 4° C., about 5° C. and a temperature of about 6° C.; and wherein
   (ii) the ultra-low oxygen conditions are members selected from the group consisting of an oxygen concentration of about 0.015% $O_2$ and an oxygen concentration of about 0.025% $O_2$; and
   (iii) the time period is a member selected from the group consisting of about 2 days and about three days.

29. The method of claim 27, wherein the lettuce is placed in a controlled temperature environment at a temperature of about 10° C.; and wherein the ultra-low oxygen conditions comprise an oxygen concentration in a range of between about 0.015% $O_2$ about 0.025% $O_2$ for a time period of about 1 day.

30. The method of claim 1, wherein the method is conducted in a container prior to shipping of said commodities.

31. The method of claim 1, wherein the method is conducted after harvest prior to packaging the commodities for shipping.

32. The method of claim 1, wherein the method is conducted in a shipping container during transit.

33. A container for carrying out the method of claim 1.

34. The container of claim 33, wherein the container comprises:
   (a) a sealable enclosure;
   (b) an oxygen sensor;
   (c) a system for circulating air within the sealable enclosure;
   (d) an automatic feedback control sensitive to oxygen concentration;
   (e) a temperature control; and
   (f) a nitrogen source or generator.

35. The container of claim 34, further comprising a carbon dioxide absorbent.

36. The container of claim 35, wherein the carbon dioxide absorbent is sodalime.

37. The container of claim 34, wherein the automatic feedback is triggered when the oxygen concentration drops below a set level.

38. The container of claim 37, wherein triggering of the automatic feedback results in release of ambient air or release of a nitrogen mix comprising oxygen, into the container.

39. The container of claim 33, wherein the container is a member selected from the group consisting of a shipping container and a storage container.

40. A method of controlling pest populations on agricultural commodities without injury to the commodities, the method comprising consisting essentially of:
   (a) placing said commodities in an enclosure capable of generating and maintaining a controlled atmosphere and a controlled temperature environment, wherein the temperature in the controlled temperature environment is in a range of between about 0° C. to about 30° C.; and
   (b) flushing the enclosure with an inert gas to initiate ultra-low oxygen conditions, thereby exposing said commodities to ultra-low oxygen conditions, wherein the ultra-low oxygen conditions comprise conditions wherein the oxygen ($O_2$) concentration of the atmosphere is less than about 0.02% $O_2$ for a length of time sufficient to kill the pests without injury to the commodities.

* * * * *